(12) United States Patent
Zhang

(10) Patent No.: US 11,936,881 B2
(45) Date of Patent: Mar. 19, 2024

(54) REGION OF INTEREST BASED IMAGE DATA ENHANCEMENT IN A TELECONFERENCE

(71) Applicant: Hewlett-Packard Development Company, L.P., Spring, TX (US)

(72) Inventor: Kui Zhang, Santa Cruz, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 283 days.

(21) Appl. No.: 17/449,649

(22) Filed: Sep. 30, 2021

(65) Prior Publication Data

US 2023/0100130 A1 Mar. 30, 2023

(51) Int. Cl.
*G06V 10/25* (2022.01)
*H04N 19/167* (2014.01)
*H04N 21/4728* (2011.01)

(52) U.S. Cl.
CPC ......... *H04N 19/167* (2014.11); *G06T 3/4053* (2013.01); *G06V 10/25* (2022.01); *H04N 21/4728* (2013.01)

(58) Field of Classification Search
CPC .... G06V 10/25; G06T 3/4053; H04N 19/167; H04N 21/4728
See application file for complete search history.

(56) References Cited

U.S. PATENT DOCUMENTS

| | | | |
|---|---|---|---|
| 7,020,203 B1 | 3/2006 | Horowitz et al. | |
| 9,554,085 B2 | 1/2017 | Iyer et al. | |
| 10,574,899 B2 | 2/2020 | Wang et al. | |
| 10,904,485 B1 | 1/2021 | Childress et al. | |
| 10,999,531 B1 | 5/2021 | Bryan et al. | |
| 2006/0215752 A1 | 9/2006 | Lee et al. | |
| 2014/0341280 A1* | 11/2014 | Yang | H04N 7/15 375/240.08 |
| 2016/0165257 A1* | 6/2016 | Chen | H04N 19/124 375/240.12 |
| 2019/0026864 A1* | 1/2019 | Chen | G06T 3/4053 |
| 2019/0098347 A1* | 3/2019 | Chaugule | H04N 21/6587 |
| 2022/0207648 A1* | 6/2022 | Petersson | G06T 3/4046 |

OTHER PUBLICATIONS

Ahn Namhyuk et al: "Fast, Accurate, and Lightweight Super-Resolution with Cascading Residual Network", Oct. 6, 2018 (Oct. 6, 2018), pp. 256-272, (Ahn et al.). (Year: 2018).*

Liu Zhi-Song et al: "Image Super-Resolution via Attention Based Back Projection Networks", 2019 IEE/CVF International Confreence on Computer Vision Workshop (ICCVW), IEEE, Oct. 27, 2019 (Oct. 27, 2019), pp. 3517-3525 (Year: 2019).*

Ahn, N., et al., "Fast, Accurate, and Lightweight Super-Resolution with Cascading Residual Network", Computer Vision—ECCV 2018, vol. 11214, Oct. 6, 2018, pp. 256-272.

(Continued)

*Primary Examiner* — Myron Wyche
(74) *Attorney, Agent, or Firm* — Quarles & Brady LLP

(57) ABSTRACT

A system for updating/magnifying regions within one or more data frames containing a region of interest while regions outside the region of interest are not updated or are updated less frequently. Edge devices are thereby able to surgically apply super-resolution algorithms to relevant regions of image frames, thereby leveraging their overall effectiveness.

17 Claims, 4 Drawing Sheets

(56) References Cited

OTHER PUBLICATIONS

Liu, Z.S., et al., "Image 4 Super-Resolution via Attention Based Back Projection Networks", 2019 IEEE/CVF International Conference on Computer Vision Workshop, IEEE, Oct. 27, 2019, pp. 3517-3525.

Zhang, Y. et al., "Image Super-Resolution Using Very Deep Residual Channel Attention Networks", ECCV 2018, vol. 11211, Jul. 8, 2018, pp. 294-310.

Ahn, Namhyuk, Byungkon Kang, and Kyung-Ah Sohn. "Fast, Accurate, and Lightweight Super-Resolution with Cascading Residual Network—Openaccess.thecvf.com." (2018) Department of Computer Engineering, Ajou University. Accessed Oct. 7, 2021. https://openaccess.thecvf.com/content_ECCV_2018/papers/Namhyuk_Ahn_Fast_Accurate_and_ECCV_2018_paper.pdf.

Dong C., Loy C.C., Tang X. (2016) Accelerating the Super-Resolution Convolutional Neural Network. In: Leibe B., Matas J., Sebe N., Welling M. (eds) Computer Vision—ECCV 2016. Lecture Notes in Computer Science, vol. 9906. Springer, Cham. https://doi.org/10.1007/978-3-319-46475-6_25.

Mwiti, Derrick, and Katherine (Yi) Li; "Image Segmentation in 2021: Architectures, Losses, Datasets, and Frameworks: Neptune Blog." neptune.ai, Aug. 13, 2021. https://neptune.ai/blog/image-segmentation-in-2020.

Zhang, Yulun, Kunpeng Li, Kai Li, Lichen Wang, Bineng Zhong, and Yun Fu. "Image Super-Resolution Using Very Deep Residual Channel Attention Networks 0arxiv:1807.02758v2 . . . " Computer Science—Computer Vision and Pattern Recognition. Cornell University, Jul. 12, 2018. https://arxiv.org/pdf/1807.02758.pdf.

* cited by examiner

REGION OF INTEREST BASED IMAGE DATA ENHANCEMENT IN A TELECONFERENCE

BACKGROUND OF THE INVENTION

Field of the Invention

The present invention relates generally to videoconferencing and relates particularly to systems and methods to improve the resolution of regions of image data frames which correspond to regions of interest during a videoconference.

Description of the Related Art

During a videoconference, people at a videoconferencing endpoint interact with people at one or more other videoconferencing endpoints. Such interaction involves using a camera device at a first endpoint to capture image data frames for transmission to a remote endpoint. However, replacing an entire captured image data frame with an entire subsequently captured frame using high-resolution data can be computationally expensive. During a videoconference, some regions of an image data frame—such as those depicting a person who is actively talking—may be of greater interest to a viewer at a remote endpoint. It is therefore desirable to have an improved mechanism for determining which (sub)regions of an existing frame should be updated with higher resolution data (e.g., regions of interest) while other regions can be updated with lower resolution data or not updated at all.

SUMMARY OF THE INVENTION

To improve the videoconferencing experience, this disclosure describes systems, methods, and devices for updating sub-regions of image data frames in high definition based on a determination of a region of interest within such frames.

In one embodiment, a method for selectively enhancing regions of image data frames captured at a teleconferencing endpoint is provided, where the method includes: capturing a first image data frame using an image capture device of the teleconferencing endpoint; determining, by a processor of the teleconferencing endpoint, a first region of interest within the first image data frame; rendering, in a memory of the teleconferencing endpoint, the first image data frame as a key frame; capturing, using the camera, a second image data frame; determining, by the processor, a second region of interest within the second image data frame; updating, by the processor, data in the key frame corresponding to the second region of interest in accordance with an image data enhancement algorithm, to produce a subsequent frame; and transmitting the subsequent frame to a remote endpoint through a network interface of the teleconferencing endpoint.

Another embodiment provides a teleconferencing system that includes: a processor; an image capture device configured to capture a series of visual data frames for processing by the processor; a memory configured to store one or more visual data frames; a network interface configured to transmit visual data frames to a remote endpoint; a data bus coupled to the processor, the camera, the network interface, and the memory; and a non-transitory, computer-readable storage medium, coupled to the data bus, and storing computer program code executable by the processor, the computer program code comprising computer program code instructions configured to capture a first image data frame using the camera; determine a first region of interest within the first image data frame; render the first image data frame in the memory as a key frame; capture a second image data frame using the camera; determine a second region of interest within the second image data frame; update data of the key frame corresponding to the second region of interest in accordance with an image data enhancement algorithm to produce a subsequent frame; and transmit the subsequent frame to a remote endpoint through the network interface.

In another embodiment, a non-transitory computer readable medium storing instructions executable by a processor is provided, wherein the instructions comprise instructions to: capture, using an image capture device, a first image data frame; determine a first region of interest within the first image data frame; render, in a memory, the first image data frame as a key frame; capture, using the camera, a second image data frame; determine, a second region of interest within the second image data frame; update data of the key frame corresponding to the second region of interest using an image data enhancement algorithm to produce a subsequent frame; and transmit, through a network interface, the subsequent frame to a remote endpoint.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method are disclosed for determining which region of an image data frame should be updated using an image enhancing algorithm so that the selected region can be rendered in higher resolution for a viewer.

During a videoconference, a scene at a videoconferencing system can be captured by an electronic pan-tilt zoom (EPTZ) camera as a series of image data frames. It can be computationally prohibitive and unnecessary to render all regions of each captured image data frame in high definition. Embodiments of this invention are thus directed to determining which region of a data frame is "important" and should be rendered in high definition while other areas of less importance need not be rendered in high definition.

For example, during a teleconference there may be participant who is talking and gesturing at an endpoint, while areas in the participant's environment (at the endpoint) do not change, or change very little, from frame to frame in a given period of time. Embodiments of the invention can identify the region of an image data frame containing this participant as a region of interest and update the region of a previously captured image data frame corresponding to the region of interest using an image data enhancement algorithm. However, regions outside the region of interest are updated less frequently, or are updated using a less computationally expensive algorithm, or are both updated less frequently and updated using a less computationally expensive (e.g., less complicated) algorithm. Various methods exist for determining which regions of an image data frame correspond to a region of interest. See for example, U.S. Pat. No. 10,999,531 to Bryan et al. entitled, "Detecting and Framing a Subject of Interest in a Teleconference." While embodiments of this disclosure refer to various mechanisms for determining a region of interest, these mechanisms are described to provide a better understanding of the invention and are not intended to limit the scope of the invention. The principle of selectively updating regions of image data frames in high-resolution is illustrated in FIG. 1.

Figure 1:
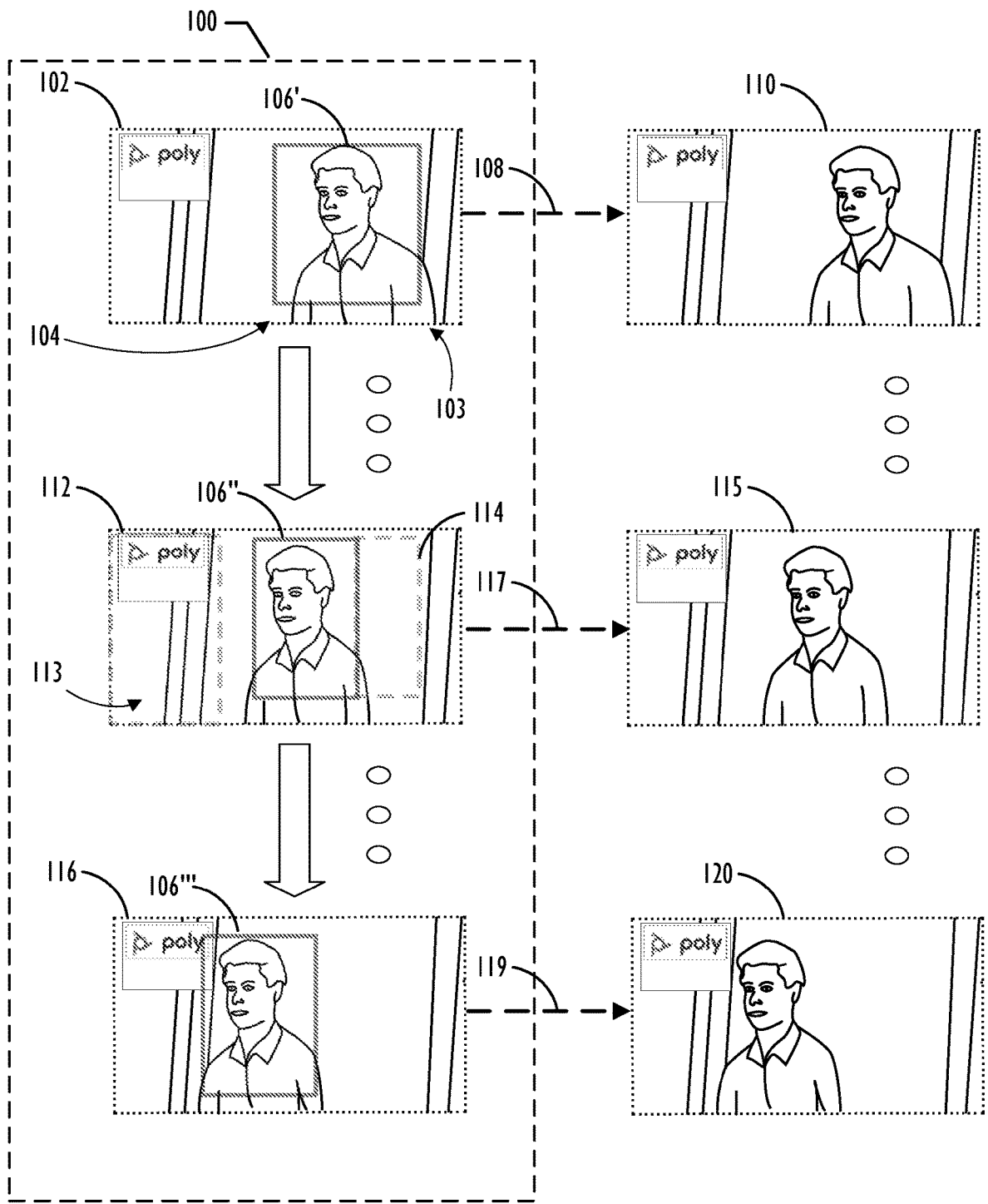
FIG. 1 is a simplified block diagram illustrating a process of identifying and updating a region of interest with high-resolution data in a series of image data frames.

FIG. 1 illustrates a series 100 of image data frames captured with an image capture device and stored in a computer memory. In captured image data frame 102 a person, 103, is determined (in accordance with one or more algorithmic modules stored in a computer memory) to be a subject of interest 104. A subject of interest 104 can be a person or an object that a viewer at a remote endpoint is more likely to find interesting during a teleconference. In this embodiment, the determination that the image data frame 102 depicts a subject of interest 104 is used to determine a region of interest 106. In the embodiment of FIG. 1, the region of interest 106 corresponds to an area in the image data frame 102 which contains person 103's head and shoulders. In this embodiment, captured image data frame 102 is stored 108 as a key frame 110. The term key frame is used to indicate that image data frame 110 will be used as a reference or base frame for subsequently captured image data frames until replaced by a new (subsequently captured) image data frame. Key frame 110 (or some region thereof) can be encoded using a computer processor and transmitted to a remote endpoint within a data stream.

Thereafter, image data frame 112 is captured. In captured image data frame 112, the subject of interest 104 (person 103) has moved forward, and the region of interest 106 has moved with him 104. (Various methodologies for tracking the location of a person during a videoconference are available to the person of skill. See e.g., U.S. Pat. No. 10,574,899 to Wang et al., entitled "People Detection Method for Auto-Framing and Tracking in a Video Conference.") Since the viewer (e.g., a person at a remote endpoint) is interested in person 103, the pixels of key frame 110 corresponding to the region of interest 106 of frame 112 are updated using an image data enhancement algorithm to render 117 updated frame 115 (in a computer memory) so person 103 will be seen in high definition, whereas the region of frame 110 outside the region of interest 106 of frame 112—including a region 114 corresponding to the region of interest 106 of frame 102—are updated using a lower resolution algorithm. Additionally, in some embodiments, instead of updating all portions of key frame 110 outside the region of interest 106, some regions (e.g., region 113) may not be updated at all, (e.g., because there has been no movement in those regions). Updating of frame 110 in keeping with the region of interest 106 in frame 112 is thus used to render 117 revised frame 115, which may then be transmitted for viewing at a remote endpoint. As noted, in some embodiments, regions which are external to the region of interest 106 in both captured frame 102 and captured frame 112, (e.g., region 113) are not updated with the capture of frame 112. Frame 115 can then be transmitted to a remote endpoint. In some embodiments, only those portions of frame 115 which have been revised need to be encoded because the preexisting elements from key frame 110 have already been encoded.

Thereafter, image data frame 116 is captured. In captured frame 116, it can be seen that person 103 has moved further still. As before, the region of interest 106 has moved because (in this example) the subject of interest 104 (person 103) has moved. Frame 115 (which in this example contains elements of key frame 110 and elements of frame 112) is updated 119 in accordance with the changed location of the region of interest 106 in frame 116. The area of frame 115 corresponding region of interest 106 in frame 116 is updated 119 using a high-resolution algorithm to produce frame 120, while areas of frame 115 corresponding to regions of frame 116 outside the region of interest 106 are updated using a lower resolution algorithm, or as discussed with reference to frame 112, in some embodiments, some regions of frame 115 are not updated, (e.g., because they contain only unchanged background environment). The region of interest 106 in each frame of FIG. 1 occupies a relatively large region of the frames. However, it can also occur that the region of interest is a smaller region of a frame. In some embodiments therefore, higher resolution algorithms are applied to the region of interest 106 when the region of interest 106 is smaller because a greater degree of magnification is required to show the region of interest 106 in higher resolution. A processor can determine what proportion a region of interest 106 takes up with respect to an image data frame (e.g., 116) and select an image enhancement algorithm accordingly.

As will be understood by those of skill in the art, increasing the resolution of a region within an image data frame captured by an electronic pan-tilt zoom (EPTZ) camera necessarily involves a form of 'virtual' magnification because the focal length of an EPTZ camera does not change. To generate an image which has a higher resolution than an image captured with an EPTZ camera, a computer algorithm is applied to captured pixel data to interpolate pixel data which can be used to generate pixels which are placed between pixels corresponding to captured data. The greater resolution or magnification that is desired, the more computationally complex is the algorithm which is required to enable that resolution or magnification. More complex algorithms generally require greater computer resources than do less complicated algorithms. The benefits of selectively determining which regions of an image data frame warrant increased resolution or magnification should thus be apparent to those of skill in the art.

Figure 2:
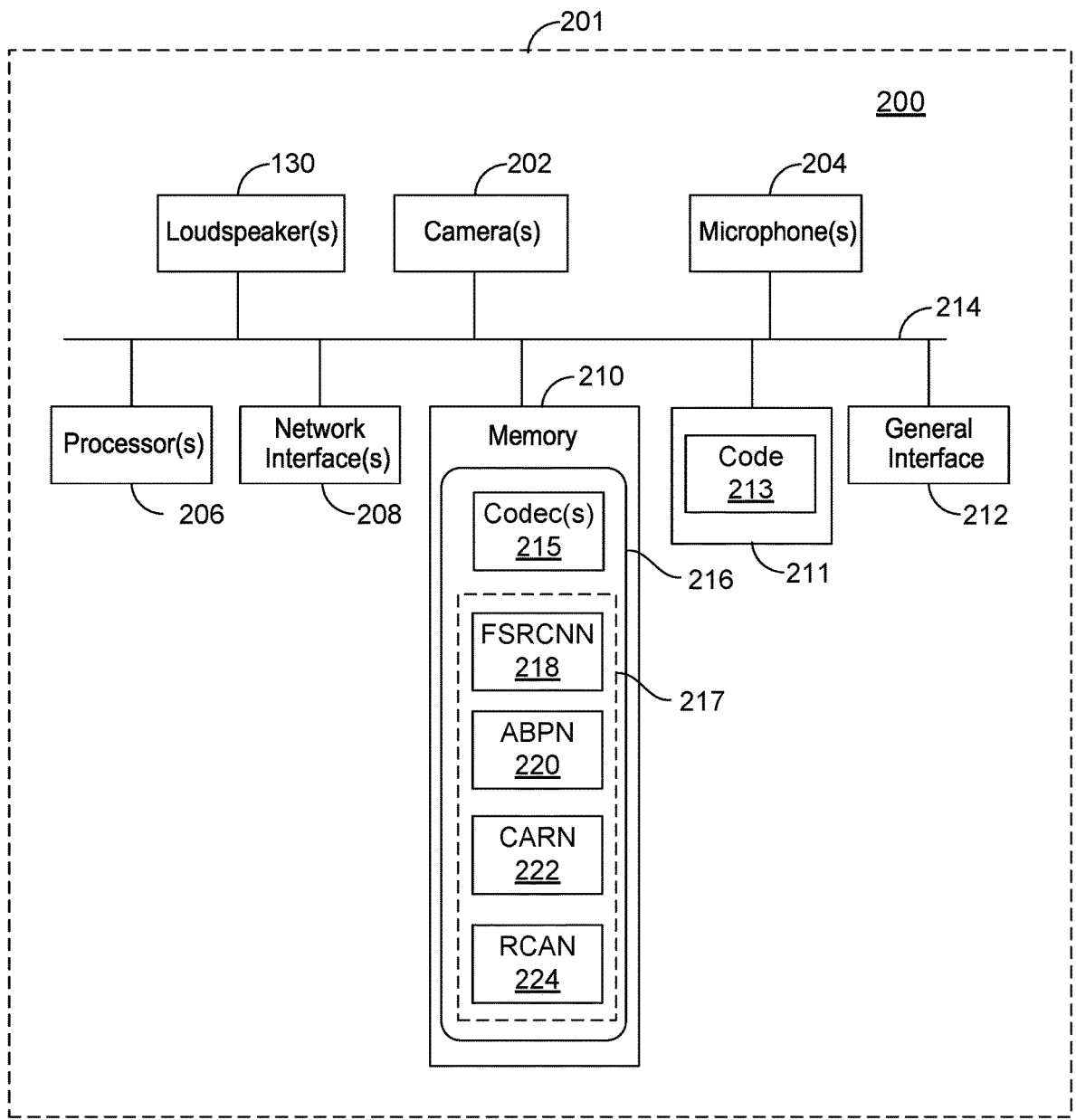
FIG. 2 is a simplified block diagram illustrating a videoconferencing system capable of implementing processes such as that of FIG. 1.

FIG. 2 illustrates aspects of a videoconferencing system 200 of a videoconferencing endpoint 201, in accordance with an embodiment of this disclosure. The system 200 includes a loudspeaker 130, EPTZ camera(s) 202 and microphones 204. EPTZ camera 202 is used to capture one or more series 100 of image data frames (e.g., 102, 112, 116). Other suitable image capture devices can also be utilized. The system 200 also includes a processor 206, a network interface 208, a memory 210, a storage 211, and an input/output interface 212, all coupled by data bus 214.

The memory 210 can be any type of conventional memory such as synchronous dynamic random-access memory and can store modules 216 in the form of software and firmware for controlling the system 200. (Storage 211 can also store computer program code 213 executable by the processor 206 for controlling the system 200.) In addition to audio and video codecs 215, the modules 216 can include algorithms 217 for increasing the resolution of regions of image data frames (e.g., 102, 112, 116).

There are many algorithms for increasing image data resolution available to those of skill in the art. Such image data enhancement algorithms are also known in the literature as super-resolution algorithms. Such algorithms can include imaging enhancement (super-resolution) algorithms 217 such as a fast super-resolution convolutional neural network (FSRCNN) algorithm 218, an attention-based back projection network (ABPN) algorithm 220, a cascading residual network (CARN) algorithm 222, and a residual channel attention networks (RCAN) algorithm 224. Within this group of four super-resolution algorithms 217, the FSRCNN algorithm 218 is the simplest (least complex), the ABPN algorithm 220 and the CARN algorithm 222 are more complex than the FSRCNN algorithm 218, and the RCAN algorithm 224 is the most complex. The residual channel attention networks (RCAN) algorithm 224 is at least ten times more computationally intensive than the fast super-resolution convolutional neural network (FSRCNN) algorithm 218, meaning that for every computation executed according to the FSRCNN algorithm 218, a processor (e.g., 206) running the RCAN algorithm 224 will execute ten computations.

To aid the understanding of the reader, the ABPN algorithm 220 and the CARN algorithm 222 can be considered high-resolution algorithms, and other image data enhancement algorithms which are close in computational complexity to the ABPN algorithm 220 or the CARN algorithm 222 are likewise to be considered high-resolution algorithms.

The RCAN algorithm 224 can be considered a very high-resolution algorithm, and other image data enhancement algorithms which are close in computational complexity to the RCAN algorithm 224 are likewise considered very high-resolution algorithms. Image data enhancement algorithms which are greater in computational complexity than the RCAN algorithm 224 are also considered very high-resolution algorithms for purposes of this disclosure.

The FSRCNN algorithm 218, which is the least computationally intensive of the algorithms named thus far is considered a low-resolution algorithm. Other image data enhancement algorithms which are close in computational complexity to the FSRCNN algorithm 218 are also considered low-resolution algorithms. Furthermore, other image data enhancement algorithms which are less computationally complex than the FSRCNN algorithm 218 are likewise considered low-resolution algorithms. Other super-resolution algorithms available to those of skill include the Laplacian pyramid super-resolution network (LapSRN) algorithm, the enhanced deep super-resolution network (EDSR) algorithm, and the very deep super resolution (VDSR) algorithm.

In addition to image data enhancement algorithms 217 (fast super-resolution convolutional neural network (FSRCNN) algorithm 218, attention-based back projection network (ABPN) algorithm 220, CARN algorithm 222, residual channel attention networks (RCAN) algorithm 224), the modules 216 can include operating systems, a graphical user interface that enables users to control the system 200, and other algorithms for processing audio signals and video signals as well as controlling the camera(s) 202.

The network interface 208 enables communications between the system 200 and remote endpoints (not shown). In one or more embodiments, the general interface 212 provides data transmission with local devices such as a keyboard, mouse, printer, overhead projector, display, external loudspeakers, additional cameras, and microphone pods, etc.

The camera(s) 202 and the microphone(s) 204 capture video and audio, respectively, in the videoconference environment and produce video and audio signals transmitted through the data bus 214 to the processor 206. In at least one embodiment of this disclosure, the processor 206 processes the video and audio using algorithms in the modules 216. The system 200 processes audio captured by the microphones 204 as well as the video captured by the camera(s) to determine the location of participants (321) 321 and control and select from the views of the camera(s) 202. Processed audio and video can be sent to remote devices coupled to network interface 208 and devices coupled to general interface 212.

FIGS. 3A-3E illustrate a process of determining a region of interest within a newly captured image data frame to render the region of interest in higher resolution. Determining a region of interest enables the system 200 to allocate additional computational resources to updating a region in a previously captured visual data corresponding to the region of interest without the need for revising areas not corresponding to the region of interest with high-resolution data. Other methods of evaluating a frame of image data for one or more regions of interest for enhancement are contemplated within this disclosure.

Figure 3A:
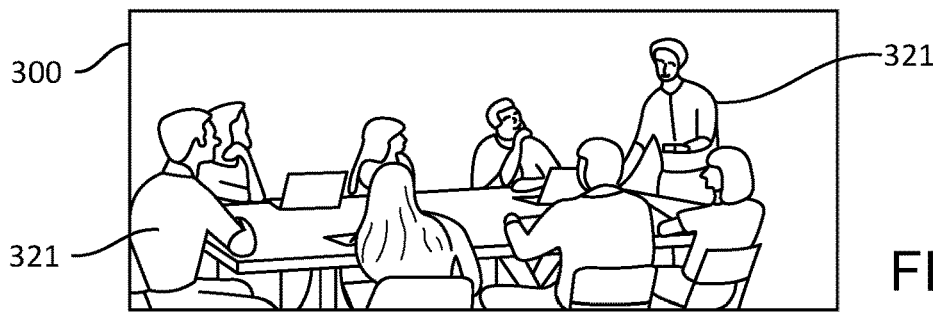
FIGS. 3A-3E illustrate a process of the videoconferencing system of FIG. 2 for capturing and evaluating a frame of image data to identify a region of the image data frame as suitable for enhancement in high definition.

FIG. 3A illustrates a frame 300 of image data, captured by an image capture device—camera 202—in accordance with an embodiment of this disclosure. The frame 300 contains a view of a meeting room with several meeting participants 321.

Figure 3B:
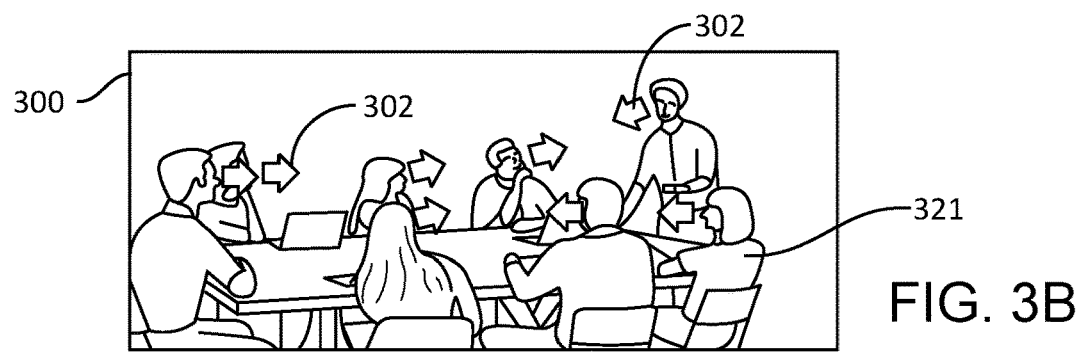

FIG. 3B illustrates that the directions 302 which the participants 321 are looking are evaluated by the processor 206. In at least one embodiment, such evaluation is based on estimating the head poses of the participants 321. In at least one embodiment, such evaluation is based on estimating the eye gaze of the participants 321. Other mechanisms of determining in which directions participants 321 are looking will be apparent to those of skill in the art.

Figure 3C:
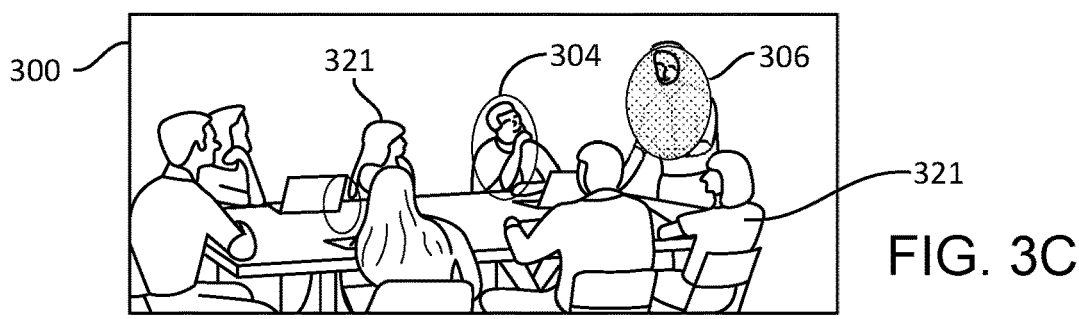

FIG. 3C illustrates that, based on the directional information garnered with respect to FIG. 3B, the processor 206 has determined that some of the participants 321 are looking at a first "hot area" 304 and some of the participants 321 are looking at a second "hot area" 306.

Figure 3D:
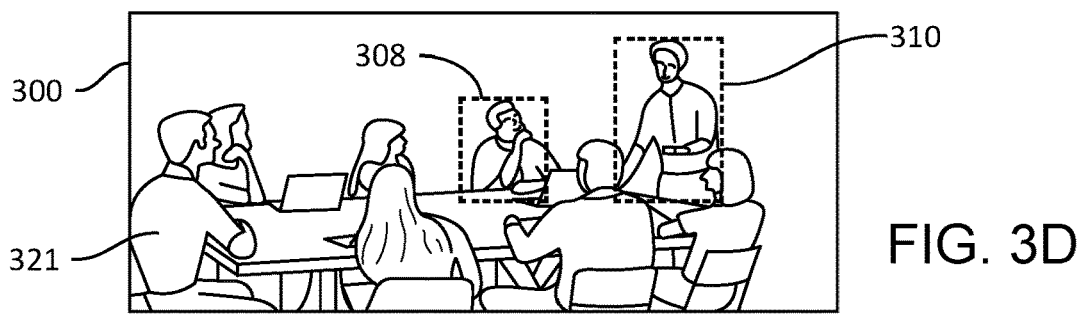

FIG. 3D illustrates that once the hot areas 304, 306 are identified by the processor, a determination is made as to whether the hot areas 304, 306 contain objects or people. In FIG. 3D, it can be seen that hot area 304 contains a first meeting participant and hot area 306 contains a second meeting participant. The first meeting participant is depicted in sub-region 308 of the frame, and the second meeting participant is within sub-region 310. It is worth noting that a determination as to whether any of the participants 321 is currently speaking can also be used when evaluating who (or what) is the current focus of interest in the captured image (e.g., 300).

Figure 3E:
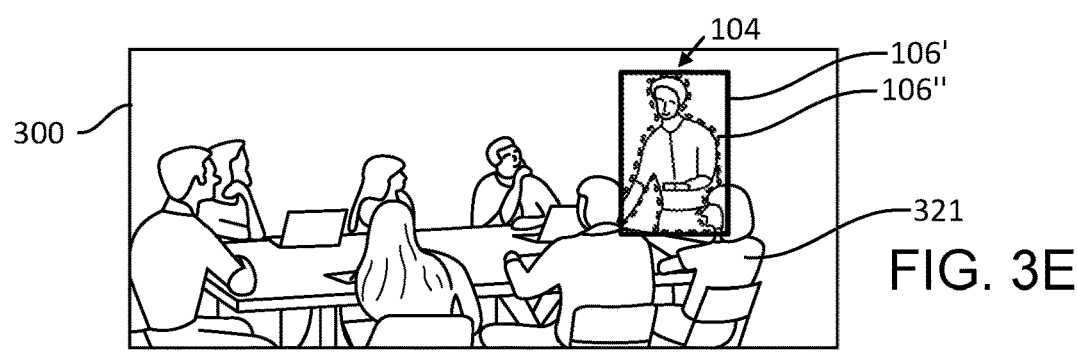

FIG. 3E illustrates that once it has been confirmed by the processor 206 that the hot areas 304, 306 correspond to objects (as opposed to e.g., empty space), the processor 206 makes a final determination as to which object (e.g., participant) is the subject of interest 104, such as by determining that most of the participants 321 are looking at the subject of interest 104 or that the subject of interest 104 is currently talking. The subject of interest 104 can be bounded within a (polygonal) region of interest 106' of the frame 300. Alternately or additionally, the subject of interest 104 can be bounded within a region of interest 106" of the frame 300 hewn more closely to the outline (e.g., perimeter) of the subject of interest 104. Various suitable techniques for accurately determining bounded region 106 are available in the literature. See e.g., Derrick Mwiti, "Image Segmentation in 2021: Architectures, Losses, Datasets, and Frameworks," https://neptune.ai/blog/image-segmentation-in-2020, which describes the use of convolutional artificial neural networks (which are high level algorithms) to improve localization of data object boundaries. The image data within either region of interest 106 can be updated using a super-resolution algorithm 217 before some or all of the image frame 300 is encoded and transmitted to a remote endpoint or rendered on a display device (not shown). In some embodiments, when the processor 206 determines that the region of interest 106 occupies more than twenty-five percent of an image data frame (see FIG. 1), the processor 206 will apply a high-resolution algorithm (e.g., 220, 222) to the data within the region of interest 106. In some embodiments, when the processor 206 determines that the region of interest 106 occupies an area less than or equal to the area of an image data frame (e.g., 300), the processor 206 will apply a very high-resolution algorithm (e.g., 224) to the data within the region of interest 106.

Figure 4:
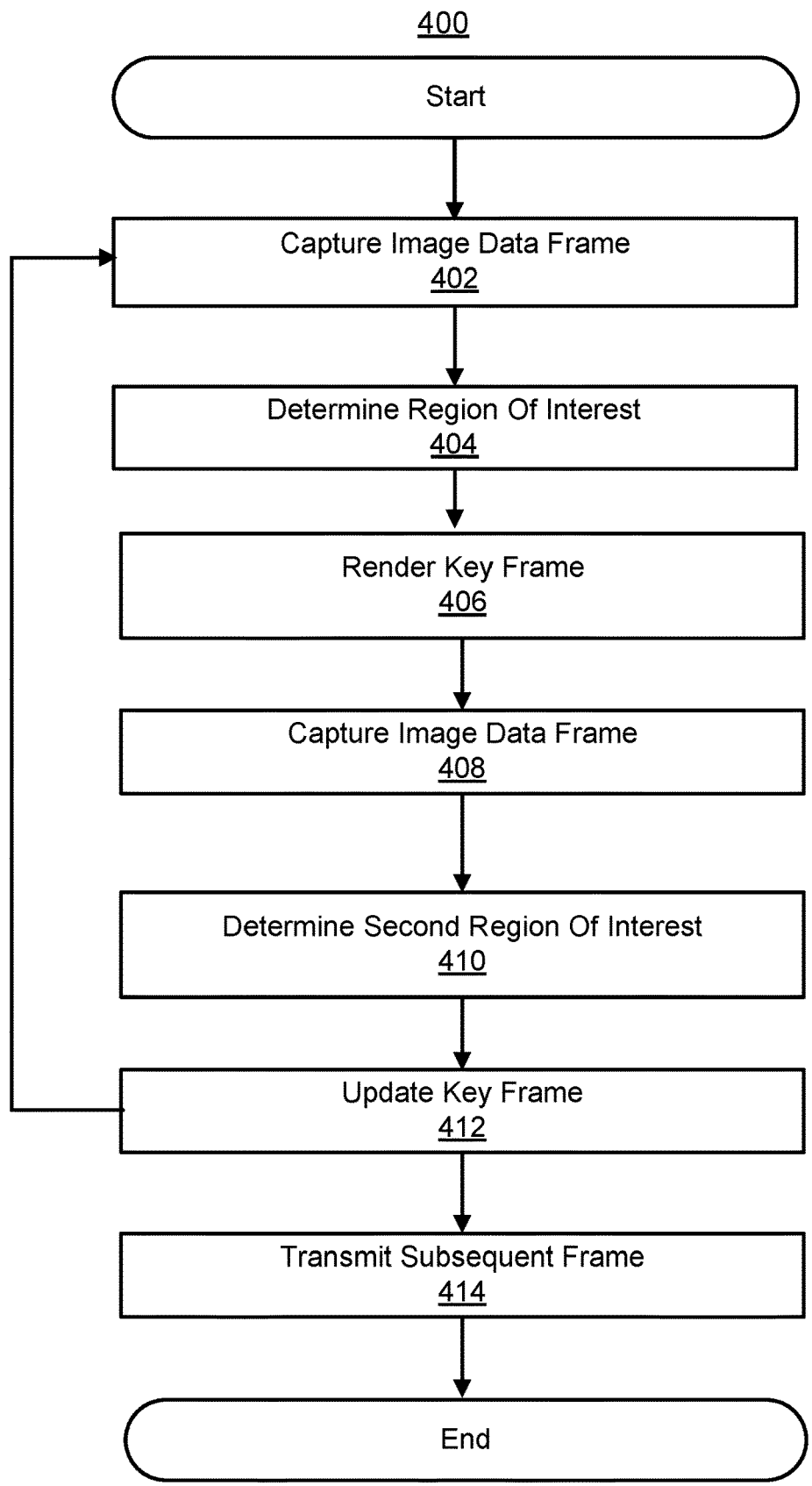
FIG. 4 illustrates aspects of a method for selectively enhancing regions of one or more image data frames, in accordance with an embodiment of this disclosure.

FIG. 4 is a flowchart laying out steps of a method 400 of identifying a region of interest (e.g., 106) within an image data frame (e.g., 300) for high-definition rendering in a teleconferencing environment. In the embodiment of FIG. 4, a teleconferencing system (e.g., 200) captures 402 a first image data frame (e.g., 102, 300) using an image capture device (e.g., 202) at a teleconferencing endpoint (e.g., 201). A processor 206 at the teleconferencing endpoint 201 then determines 404 a region of interest (e.g., 106) within the first image data frame 102, 300. The processor 206 can apply any suitable region of interest determination methodology understood by those of skill in the art. E.g., determining 404 that a region is a region of interest 106 can involve detecting facial features in the region, determining that the region depicts an active talker, or determining that other people detected at an endpoint 201 are looking towards a person or object within the region 106. (See discussions of FIG. 1 and FIGS. 3A-3E.)

Thereafter, the processor 206 renders 406 the first image data frame as a key frame (e.g., 110) in a memory (e.g., 210) of the teleconferencing system 200. The key frame 110 can then be encoded (using one or more modules 216 of memory 210) and transmitted to a remote endpoint through network interface (e.g., 208).

After capturing 402 the first image data frame 102 and rendering 406 the key frame 110, the camera 202 then captures 408 a second image data frame (e.g., 112). Of course, the camera 202 can capture 408 the second image data frame before the key frame 110 is rendered 406 or while the key frame 110 is being rendered 406. As the processor 206 did with respect to image data frame 102, the processor 206 determines 410 a region of interest 106 within the second image data frame 112. It will be understood by those of skill in the art that determining 404 the region of interest 106 in the first image data frame 102 will speed the process of determining 410 the region of interest 106 in the second image data frame 112. The processor 206 does not simply replace key frame 110 with the second image data frame 112. Instead, the processor 206 updates 412 image data in the key frame 110 corresponding to the second region of interest 106 in the newly captured frame 112 using an image data enhancement algorithm 217 such as an attention-based back projection network (ABPN) algorithm 220 to produce (e.g., 117) a subsequent frame (e.g., 115). It will be understood that subsequent frame 115 contains some image data from key frame 110 and some (enhanced) image data of image data frame 112.

Thereafter, the system 200 will transmit 414 the subsequent frame 115 to a remote endpoint through the network interface 208. It will be understood that during a teleconference, the teleconferencing system 200 will continue to capture new frames (N) and determine whether regions in a previously captured frame (N-1) should be updated using a super-resolution algorithm 217 based on a determination that corresponding regions in a newly captured image data frame (N) are regions of interest 106.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for selectively enhancing regions of image data frames captured at a teleconferencing endpoint, comprising:

capturing a first image data frame using an image capture device of the teleconferencing endpoint;

identifying, by a processor of the teleconferencing endpoint, a first region of interest within the first image data frame;

rendering, in a memory of the teleconferencing endpoint, the first image data frame as a key frame;

capturing, using the image capture device, a second image data frame;

identifying, by the processor, a second region of interest within the second image data frame;

applying, by the processor when the processor determines that the second region of interest occupies more than twenty-five percent of the second image data frame, an image data enhancement algorithm to data within the second region of interest;

producing, by the processor, a subsequent frame when the processor applies the image data enhancement algorithm to the data within the second region of interest; and transmitting the subsequent frame to a remote endpoint through a network interface of the teleconferencing endpoint.

2. The method of claim 1, wherein the image data enhancement algorithm is a high-resolution algorithm.

3. The method of claim 2, wherein the high-resolution algorithm is an Attention-based Back Projection Network algorithm.

4. The method of claim 2, wherein the high-resolution algorithm is a cascading residual network algorithm.

5. The method of claim 1, wherein updating, by the processor, data in the key frame corresponding to the second region of interest in accordance with the image data enhancement algorithm to produce the subsequent frame comprises:

updating, by the processor, data in the key frame corresponding to the first region of interest and not corresponding to the second region of interest in accordance with the image data enhancement algorithm to produce the subsequent frame.

6. The method of claim 1, wherein updating, by the processor, data in the key frame corresponding to the second region of interest in accordance with the image data enhancement algorithm to produce the subsequent frame comprises:
determining that the second region of interest occupies twenty-five percent of the second image data frame or less.

7. The method of claim 6, wherein the image data enhancement algorithm is a very high-resolution algorithm.

8. The method of claim 7, wherein the very high-resolution algorithm is a residual channel attention networks algorithm.

9. The method of claim 1, wherein updating, by the processor, data in the key frame corresponding to the second region of interest in accordance with the image data enhancement algorithm to produce the subsequent frame comprises:
updating at least some data in the key frame corresponding to a region external to the first region of interest and the second region of interest using a low-resolution algorithm.

10. The method of claim 1, wherein:
determining the first region of interest comprises determining that the first region of interest depicts a subject of interest; and
determining the second region of interest comprises determining that the second region of interest depicts the subject of interest.

11. A teleconferencing system, comprising:
a processor;
an image capture device configured to capture a series of visual data frames for processing by the processor;
a memory configured to store one or more visual data frames;
a network interface configured to transmit visual data frames to a remote endpoint;
a data bus coupled to the processor, the image capture device, the network interface, and the memory; and
a non-transitory, computer-readable storage medium, coupled to the data bus, and storing computer program code executable by the processor,
the computer program code comprising computer program code instructions configured to:
capture a first image data frame using the image capture device;
determine a first region of interest within the first image data frame;
render the first image data frame in the memory as a key frame;
capture a second image data frame using the image capture device;
determine a second region of interest within the second image data frame;
apply, when the processor determines that the second region of interest occupies more than twenty-five percent of the second image data frame, an image data enhancement algorithm to data within the second region of interest;
produce a subsequent frame when the processor applies the image data enhancement algorithm to the data within the second region of interest; and
transmit the subsequent frame to a remote endpoint through the network interface.

12. The teleconferencing system of claim 11, wherein the image data enhancement algorithm is a high-resolution algorithm.

13. The teleconferencing system of claim 12, wherein the image data enhancement algorithm is a very high-resolution algorithm.

14. The teleconferencing system of claim 13, wherein the very high-resolution algorithm is residual channel attention networks algorithm.

15. The teleconferencing system of claim 11, wherein the computer program code instructions configured to update data in the key frame corresponding to the second region of interest in accordance with the image data enhancement algorithm to produce the subsequent frame comprise further instructions configured to:
update data in the key frame corresponding to the first region of interest and not corresponding to the second region of interest in accordance with the image data enhancement algorithm to produce the subsequent frame.

16. A non-transitory computer readable medium storing instructions executable by a processor, wherein the instructions comprise instructions to:
capture, using an image capture device, a first image data frame;
determine a first region of interest within the first image data frame;
render, in a memory, the first image data frame as a key frame;
capture, using the image capture device, a second image data frame;
determine, a second region of interest within the second image data frame;
apply, when the processor determines that the second region of interest occupies more than twenty-five percent of the second image data frame, an image data enhancement algorithm to data within the second region of interest;
produce a subsequent frame when the processor applies the image data enhancement algorithm to the data within the second region of interest; and
transmit, through a network interface, the subsequent frame to a remote endpoint.

17. The non-transitory computer readable medium of claim 16, wherein the image data enhancement algorithm is a high-resolution algorithm.

* * * * *